United States Patent
Kurahashi et al.

(10) Patent No.: US 8,080,776 B2
(45) Date of Patent: Dec. 20, 2011

(54) IMAGING DEVICE (75) Inventors: Hajime Kurahashi, Sano (JP); Hideyuki Matsushita, Sano (JP)

(73) Assignee: Fujifilm Corporation, Tokyo (JP)

( * ) Notice: Subject to any disclaimer, the term of this patent is extended or adjusted under 35 U.S.C. 154(b) by 288 days.

(21) Appl. No.: 12/472,746

(22) Filed: May 27, 2009

(65) Prior Publication Data
US 2009/0294634 A1 Dec. 3, 2009

(30) Foreign Application Priority Data
May 28, 2008 (JP) ................ P2008-139109

(51) Int. Cl.
*H01J 3/14* (2006.01)
(52) U.S. Cl. .............................................. 250/216
(58) Field of Classification Search .............. 250/216, 250/214.1, 226, 227.2, 227.23; 359/359
See application file for complete search history.

(56) References Cited

U.S. PATENT DOCUMENTS

| | | | |
|---|---|---|---|
| 5,818,956 A | 10/1998 | Tuli | |
| 7,524,690 B2 * | 4/2009 | Ko et al. ............... | 438/31 |
| 2004/0264537 A1 | 12/2004 | Jackson | |
| 2007/0097512 A1 | 5/2007 | Toyoda et al. | |
| 2007/0253607 A1 | 11/2007 | Higuchi | |
| 2008/0013178 A1 * | 1/2008 | Terada ................... | 359/586 |
| 2009/0002830 A1 | 1/2009 | Okamoto | |

FOREIGN PATENT DOCUMENTS

| | | |
|---|---|---|
| CN | 101105547 A | 1/2008 |
| CN | 101174751 A | 5/2008 |
| JP | 8-110762 A | 4/1996 |
| JP | 2004-151124 A | 5/2004 |
| JP | 2007-121631 A | 5/2007 |
| JP | 2007-171181 A | 7/2007 |
| JP | 2007-299085 A | 11/2007 |
| WO | WO 2007/097198 A1 | 8/2007 |

OTHER PUBLICATIONS

Chinese Office Action (with English translation) issued on Jun. 30, 2010 in corresponding Chinese patent application No. 200910142039.6.
Japanese Notification of Reason for Refusal dated May 17, 2010 for corresponding Japanese Application No. 2008-139109.

* cited by examiner

*Primary Examiner* — Georgia Y Epps
*Assistant Examiner* — Renee Naphas
(74) *Attorney, Agent, or Firm* — Birch, Stewart, Kolasch & Birch, LLP

(57) ABSTRACT

A close contact type imaging device is an imaging device for acquiring an image of an object in a state that the object is in close contact to an image sensor. This imaging device has an angle limiting filter. The angle limiting filter is constructed from: a glass substrate of a parallel plate; and a dielectric multilayer film provided on the glass substrate. This angle limiting filter transmits light within a particular wavelength range approximately perpendicularly incident onto the surface, and shields light outside the particular wavelength range and light within the particular wavelength obliquely incident onto the surface.

4 Claims, 9 Drawing Sheets

IMAGING DEVICE

This application is based on and claims priority under 35 U.S.C §119 from Japanese Patent Application No. 2008-139109, filed on May 28, 2008, the entire disclosure of which is herein incorporated by reference.

BACKGROUND OF THE INVENTION

1. Field of the Invention

The present invention relates to an imaging device for acquiring an image of an object located at a predetermined position by utilizing light within a particular wavelength range and, in particular, to an imaging device of close contact type for acquiring an image of an object in a state that the object is almost in close contact to an image sensor.

2. Description of Related Art

Imaging devices are widely used that acquire images of manuscripts such as printed images, documents, and bar code images. As examples of such imaging devices, imaging devices of close contact type are known in which image acquisition is performed in a state that a line image sensor having the same width as a manuscript to be read is located almost in close contact to the manuscript. Such imaging devices of close contact type have a relatively short distance from the manuscript to the image sensor, and hence have a compact configuration in comparison with other types employing a reduction optical system.

When an image sensor is merely simply arranged almost in close contact to a manuscript without employing a lens or the like for forming an image of the manuscript, light beams from a particular point on the manuscript do not exclusively reach one pixel of the image sensor. That is, the light beams are incident onto a plurality of pixels in its periphery in addition to the intrinsically intended pixel. Thus, a clear image is not obtained. Thus, even in an imaging device of close contact type, a cylindrical rod lens having a refractive index distribution that decreases from the center toward the periphery is arranged between the image sensor and the manuscript so that incidence of light onto the image sensor is limited such that light from a particular point on the manuscript should reach one imaging area of the image sensor almost in one-to-one correspondence.

Further, as examples of imaging devices in which incidence of light onto the image sensor is limited, devices are known that employ a filter for limiting the incident angle of light onto the image sensor in order that the image sensor should be used in a state that the light acceptance area of the image sensor is divided into a plurality. Known examples include: an image sensor in which a shielding block is arranged in accordance with light acceptance areas to be formed (JP-A-2007-121631); and an imaging device in which a grid plate having slits is provided so that the light acceptance area is divided into rectangles (JP-A-2007-299085). Another known example is a film camera in which a multi-hole plate having a large number of through holes is provided so that the incident angle of light onto the light acceptance area is limited such that parallel light beams alone that are perpendicularly incident onto the light acceptance area reach the film (JP-A-2004-151124).

In an image sensor, photodiodes perform photoelectric conversion in individual pixels so as to obtain an image of an object. Here, the photo-diodes are located at a level deeper than the surface of the image sensor. Thus, even in an imaging device of close contact type, the object such as a manuscript cannot exactly be in close contact to the photodiodes, and hence a gap is unavoidably formed between the object and the photodiodes. When a gap is formed between the object and the photodiode, light from a particular point on the object not only enters the intrinsically intended photodiode but also enters obliquely a plurality of adjacent photodiodes. This causes noise and false signals. Thus, for the purpose of fine image acquisition, the incident angle of light onto the image sensor need be limited such that light from a particular point on the object enters one photodiode alone.

In order to avoid a situation that light from a particular point on the object enters not only the intrinsically introduced photodiode (or light acceptance area composed of photodiodes) but also adjacent photodiodes, the incident angle of light onto the image sensor need be limited, for example, by using a rod lens widely employed in an imaging device of close contact type or alternatively by using a filter for dividing the imaging area with through holes as described in JP-A-2007-121631 and JP-A-2007-299085.

Nevertheless, when a rod lens is to be employed, a relatively large assembling space is necessary in the thickness direction and hence causes difficulty in further thickness reduction. Further, in order that the rod lens should form an erect unity-magnification image of the object, the length of the rod lens, the intervals between the object, the rod lens, and the image sensor, and the like need be controlled strictly. This causes difficulty in alignment.

Further, a filter having through holes such as slits is fabricated from a metal plate or the like. Nevertheless, with decreasing through hole diameter and with decreasing through hole interval, difficulty increases in the processing of fabrication through holes. Thus, even when such minute through holes can be fabricated by machining, a high cost is caused in the filter fabrication. Further, such a filter having minute through holes has a difficulty that arrangement need be performed in such a manner that the positions of the through holes are precisely aligned with the image sensor.

When a photolithography technique is employed, a filter having minute through holes can be fabricated. Nevertheless, the same difficulty remains that arrangement need be performed in such a manner that the positions of the through holes are precisely aligned with the image sensor.

In filters having small-diameter through holes as described above, clogging is easily caused by dust, particulates, and the like in the fabrication process or at the time of assembling into a close contact type imaging device. Then, dust having once entered the through holes is difficult to be removed. Thus, in the filter having small-diameter through holes, sufficient care need be taken concerning the peripheral environment and the like at the time of handling. Further, the production yield is unsatisfactory in filters having through holes and close contact type imaging devices employing this filter. Thus, stable mass production is difficult.

Furthermore, when a part of incident light is reflected by (or transmitted through) the inner wall of each through hole, a light beam is generated that reaches outside a region defined by the diameter of the through hole. Thus, antireflection processing or the like is necessary in the inner wall of the through hole. Nevertheless, in the case of a minute through hole whose fabrication itself is difficult, a special processing onto the inner wall is remarkably difficult to be performed.

On the other hand, in place of assembling a filter having minute through holes, an arrangement of through holes is directly built in the image sensor itself by a so-called MEMS method, the necessity of processing of aligning the through holes with the image sensor is avoided. Nevertheless, when an array of through holes is to be built in the image sensor itself, the structure and the manufacturing process itself of the image sensor are affected and hence a remarkable cost increase is caused. Further, another problem arises that the process of fabricating through holes having a sufficient height in the close contact type imaging device requires a remarkable etching time and hence the image sensor having a built-in arrangement of through holes is not suitable for mass production.

SUMMARY OF THE INVENTION

The present invention has been devised in view of the above-mentioned situations. An object of an illustrative, non-limiting embodiment of the present invention is to provide an imaging device of close contact type which has satisfactory mass productivity, a suppressed fabrication cost, and a suppressed assembling space requirement in the thickness direction and in which the incident angle of light onto the image sensor is limited so that a fine image is acquired.

The imaging device according to the present invention is an imaging device for acquiring an image of an object close to an image sensor by utilizing light within a particular wavelength range, the imaging device comprising: a substrate of a parallel plate; and a dielectric multilayer film provided on the substrate, wherein the dielectric multilayer film transmits light within the particular wavelength range approximately perpendicularly incident onto a surface, and shields light within the particular wavelength range obliquely incident onto the surface.

Further, in the dielectric multilayer film, transmissivity for light that is approximately perpendicularly incident onto the surface decreases steeply on a long wavelength side relative to the particular wavelength range.

Further, the substrate is transparent, while the dielectric multilayer film serves as a band pass filter for shielding light outside the particular wavelength range approximately perpendicularly incident onto the surface.

Further, the substrate is composed of a colored substrate having been colored such as to transmit light having a longer wavelength than the particular wavelength range and absorb light having a shorter wavelength than the particular wavelength range.

Further, the dielectric multilayer film serves as a low-pass filter for transmitting light that is perpendicularly incident onto the surface and that has a shorter wavelength than the particular wavelength range and for shielding light that is perpendicularly incident onto the surface and that has a longer wavelength than the particular wavelength range.

Further, the dielectric multilayer film is provided in the two surfaces of the substrate.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

According to an aspect of the present invention, an imaging device of close contact type is provided which has satisfactory mass productivity, a suppressed fabrication cost, and a suppressed assembling space requirement in the thickness direction and in which the incident angle of light onto the image sensor is limited so that a fine image is acquired.

First Embodiment

Figure 1:
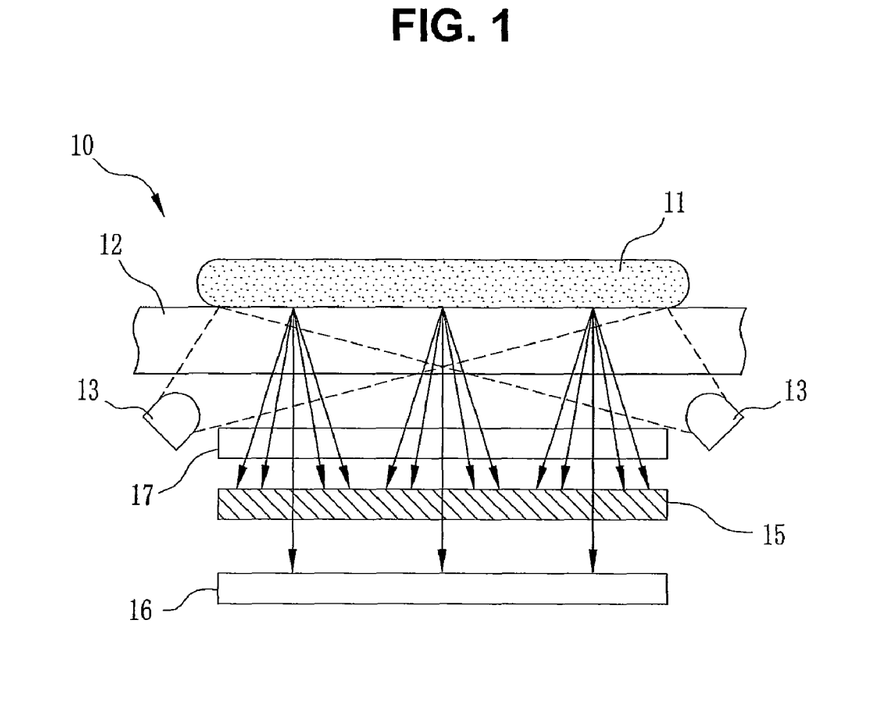
FIG. 1 is an explanation diagram schematically showing a configuration of a close contact type imaging device.

As shown in FIG. 1, a close contact type imaging device 10 is an imaging device for acquiring an image of an object 11 close to the image sensor 16 and, in particular, an imaging device suitable for acquiring an image of an object 11 almost in close contact to the image sensor 16. The close contact type imaging device 10 has a protection cover 12, an LED 13, an angle limiting filter 15 (optical filter), and an image sensor 16. The protection cover 12 is composed of a transparent glass plate and protects from scratches or dust the angle limiting filter 15 and the image sensor 16 arranged below. Further, the object 11 whose image is to be acquired is placed directly on the protection cover 12.

The LED 13 emits infrared light having a wavelength of 850 nm, and illuminates the object 11 uniformly from a location under the protection cover 12. The infrared light emitted from the LED 13 is scattered in accordance with the absorption coefficient and the reflectivity for infrared light that vary depending on the position of the surface (or internal structure) of the object 11. Then, a part of the light is condensed by a lens array (not shown) in correspondence to individual pixels, and then incident in the direction of the angle limiting filter 15 provided under the protection cover 12. At that time, the incident light that is incident from the object 11 onto the angle limiting filter 15 contains not only beams perpendicular to the angle limiting filter 15 but also beams oblique to the surface.

A high-pass filter 17 shields visible light and ultraviolet light that are incident from the outside through the protection cover 12, and transmits infrared light (light within a particular wavelength range) to be used in image acquisition. Thus, the light incident onto the angle limiting filter 15 or the image sensor 16 is limited only to infrared light within a wavelength range to be used in image acquisition. Further, as described later, the angle limiting filter 15 shields light beams obliquely incident onto the surface among light beams incident at various angles from the object 11 side, and transmits only light beams approximately perpendicularly incident onto the surface, to the image sensor 16 side.

The image sensor 16 is composed of an area image sensor of CMOS type having a sensitivity to infrared light having a wavelength of 850 nm, and acquires an image of the object 11 by using light whose incident angle is limited to be approximately perpendicular to the surface by the angle limiting filter 15. The following description is given for an exemplary case that the image sensor 16 is of CMOS type. However, an image sensor of another type such as CCD type may be employed.

Figure 2:
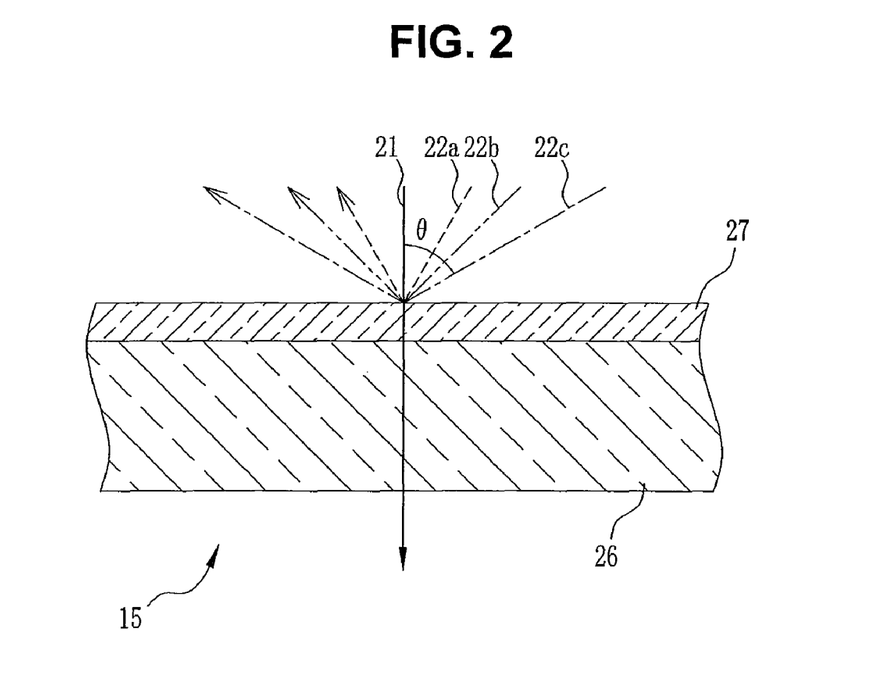
FIG. 2 is a sectional view showing a configuration of an angle limiting filter.

As shown in FIG. 2, among infrared light beams incident at various angles from the object 11 side, the angle limiting filter 15 transmits to the image sensor 16 side an infrared light beam 21 approximately perpendicularly incident onto the surface, and reflects and shields infrared light beams 22$a$ to 22$c$ obliquely incident onto the surface.

The angle limiting filter 15 is constructed from: a glass substrate 26 composed of a parallel plate; and a dielectric multilayer film 27 provided on the glass substrate 26. The glass substrate 26 is transparent, and hence transmits not only infrared light having the wavelength of 850 nm used in image acquisition in the image sensor 16 but also light having a wavelength other than this value without reflecting or absorbing it.

The dielectric multilayer film 27 is fabricated by alternately stacking dielectric films having different refractive indices from each other, and serves as a band pass filter that when light having various wavelength values containing infrared light having a wavelength of 850 nm is approximately perpendicularly incident onto the surface (incident angle $\theta=0$ degree), selectively transmits only infrared light having a wavelength of 850 nm. Thus, infrared light having a wavelength longer than 850 nm and visible and ultraviolet light having a wavelength shorter than 850 nm are shielded by the dielectric multilayer film 27 even when the light is perpendicularly incident onto the angle limiting filter 15.

Figure 3:
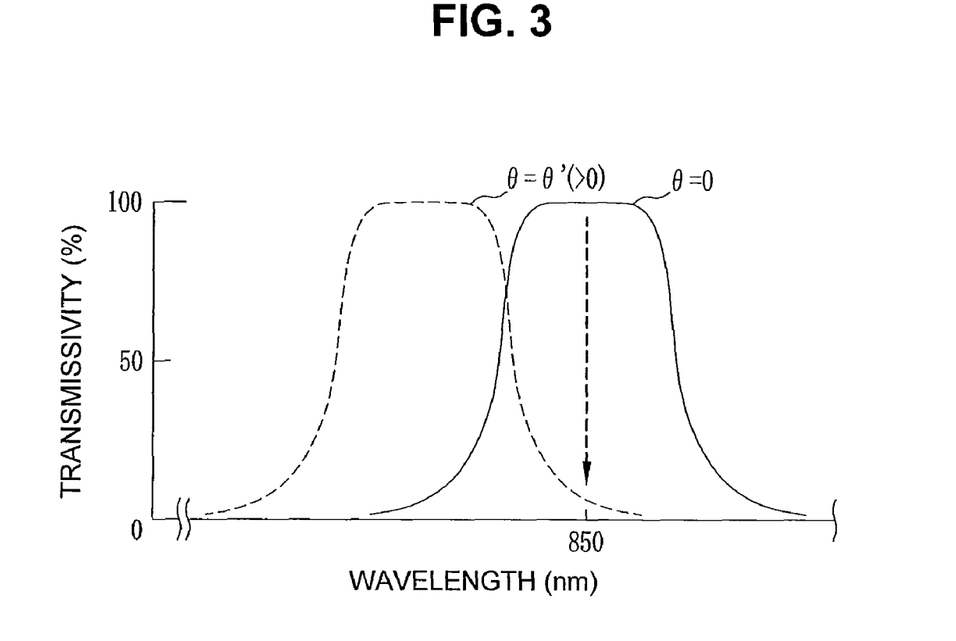
FIG. 3 is a graph schematically showing the transmissivity as a function of the wavelength.

In the angle limiting filter 15 having this configuration, when light having various wavelengths is perpendicularly incident onto the surface (incident angle $\theta=0$ degree), as indicated by a solid line in FIG. 3, the transmissivity for infrared light having a wavelength of 850 nm is approximately 100%. However, the transmissivity decreases steeply into approximately 0% on the long wavelength side and the short wavelength side relative to the wavelength of 850 nm.

Nevertheless, when light having various wavelengths is obliquely incident onto the surface of the angle limiting filter 15 ($\theta=\theta'>0$ degree), as indicated by a dashed line in FIG. 3 which is a graph showing the transmissivity characteristics as a function of the wavelength, the center wavelength of the peak shifts to the short wavelength side relative to 850 nm. At that time, the amount of shift in the graph depends on the magnitude of the incident angle $\theta'$ ($>0$ degree). Specifically, a greater incident angle $\theta'$ causes a larger shift toward the short wavelength side. Further, the shape of the shifted peak is almost unchanged and similar to that at an incident angle $\theta$ of 0 degree.

Figure 4:
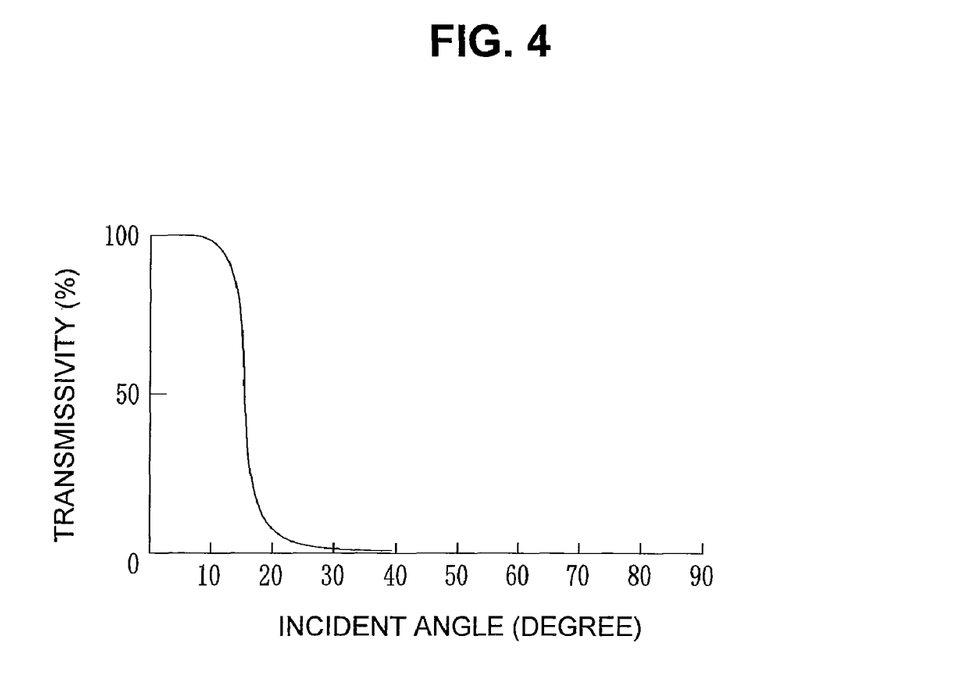
FIG. 4 is a graph schematically showing the transmissivity as a function of the incident angle.

Thus, when attention is limited to infrared light having a wavelength of 850 nm, as indicated by a dashed line arrow in FIG. 3 and shown in FIG. 4, the transmissivity which is approximately 100% at an incident angle $\theta=0$ degree decreases to approximately 0% at an incident angle $\theta=\theta'$ ($>0$). This situation is similar also for infrared light having a wavelength of 850 nm in which the transmissivity is approximately 100% at an incident angle $\theta$ of 0 degree. Thus, the angle limiting filter 15 selectively transmits infrared light that has a wavelength of 850 nm and that is approximately perpendicularly incident onto the surface, and shields light having a wavelength other than the wavelength of 850 nm and infrared light that has a wavelength of 850 nm but that is obliquely incident onto the surface.

Here, the wavelength range and the center wavelength where the transmissivity is approximately 100% for perpendicularly incident light are arbitrarily adjusted by selecting the materials, the numbers of stacked layers, the thickness values, and the like for individual dielectric films in the dielectric multilayer film 27 appropriately in accordance with the wavelength of light to be used in image acquisition. Further, the incident angle $\theta'$ where the transmissivity decreases from approximately 100% to approximately 0 % is similarly adjusted arbitrarily by selecting the materials and the layer structure for the dielectric multilayer film 27.

As described above, the angle limiting filter 15 is constructed such that the dielectric multilayer film 27 is provided on the glass substrate 26 composed of a parallel plate. Thus, the angle limiting filter 15 is thin and can easily be fabricated at a low cost by mass production.

Thus, in the close contact type imaging device 10, in addition to the advantage that the angle limiting filter 15 is easily fabricated, the necessity of precisely aligning the angle limiting filter 15 with the image sensor 76 is avoided. Thus, satisfactory mass productivity is obtained, while a low fabrication cost is achieved. Further, when the close contact type imaging device 10 employs the angle limiting filter 15, an assembling space from the image sensor 16 to the object 11 can be suppressed. This permits a thin overall configuration. Further, in the close contact type imaging device 10, the angle limiting filter 15 limits the incident angle of light from the object 11 to the image sensor so that light from a particular point on the object 11 corresponds to one imaging area (e.g., a pixel or a group of pixels) of the image sensor 16 in one-to-one correspondence. This permits a high definition image.

The angle limiting filter 15 can process various wavelengths and incident angles when the layer structure of the dielectric multilayer film 27 is adjusted. Thus, for infrared light having a wavelength of 850 nm, an angle limiting filter 15 of low directivity that has a relatively wide incident angle range for incident light to be transmitted is described below as Example 1. Further, an angle limiting filter 15 of high directivity that has a narrow wide incident angle range for incident light to be transmitted is described below as Example 2.

Example 1

As shown in Table 1, the angle limiting filter 15 of low directivity was fabricated such that a dielectric multilayer film 27 composed of tantalum pentoxide ($Ta_2O_5$) having a refractive index of 2.1136 and silicon oxide ($SiO_2$) having a refractive index of 1.4525 was provided on a glass substrate 26 having a refractive index of 1.51. The dielectric multilayer film 27 of the angle limiting filter 15 of low directivity was composed of a stack of 66 layers fabricated by alternately stacking tantalum pentoxide films and silicon oxide films each having an optical film thickness 0.25 to 1.0 at a reference wavelength of 850 nm.

TABLE 1

|   | Material | n | t |
|---|---|---|---|
|   | Air | 1.0000 |   |
| 1 | $Ta_2O_5$ | 2.1136 | 0.25 |
| 2 | $SiO_2$ | 1.4525 | 0.02 |
| 3 | $Ta_2O_5$ | 2.1136 | 0.25 |
| 4 | $SiO_2$ | 1.4525 | 0.50 |
| 5 | $Ta_2O_5$ | 2.1136 | 0.25 |
| 6 | $SiO_2$ | 1.4525 | 0.25 |
| 7 | $Ta_2O_5$ | 2.1136 | 0.75 |
| 8 | $SiO_2$ | 1.4525 | 0.25 |

TABLE 1-continued

| | Material | n | t |
|---|---|---|---|
| 9 | Ta$_2$O$_5$ | 2.1136 | 0.25 |
| 10 | SiO$_2$ | 1.4525 | 0.25 |
| 11 | Ta$_2$O$_5$ | 2.1136 | 0.75 |
| 12 | SiO$_2$ | 1.4525 | 0.25 |
| 13 | Ta$_2$O$_5$ | 2.1136 | 0.25 |
| 14 | SiO$_2$ | 1.4525 | 0.25 |
| 15 | Ta$_2$O$_5$ | 2.1136 | 0.50 |
| 16 | SiO$_2$ | 1.4525 | 0.25 |
| 17 | Ta$_2$O$_5$ | 2.1136 | 0.25 |
| 18 | SiO$_2$ | 1.4525 | 0.25 |
| 19 | Ta$_2$O$_5$ | 2.1136 | 0.25 |
| 20 | SiO$_2$ | 1.4525 | 0.25 |
| 21 | Ta$_2$O$_5$ | 2.1136 | 0.25 |
| 22 | SiO$_2$ | 1.4525 | 0.25 |
| 23 | Ta$_2$O$_5$ | 2.1136 | 0.25 |
| 24 | SiO$_2$ | 1.4525 | 0.25 |
| 25 | Ta$_2$O$_5$ | 2.1136 | 0.25 |
| 26 | SiO$_2$ | 1.4525 | 0.25 |
| 27 | Ta$_2$O$_5$ | 2.1136 | 1.00 |
| 28 | SiO$_2$ | 1.4525 | 0.25 |
| 29 | Ta$_2$O$_5$ | 2.1136 | 0.25 |
| 30 | SiO$_2$ | 1.4525 | 0.25 |
| 31 | Ta$_2$O$_5$ | 2.1136 | 0.25 |
| 32 | SiO$_2$ | 1.4525 | 0.25 |
| 33 | Ta$_2$O$_5$ | 2.1136 | 0.25 |
| 34 | SiO$_2$ | 1.4525 | 0.25 |
| 35 | Ta$_2$O$_5$ | 2.1136 | 0.25 |
| 36 | SiO$_2$ | 1.4525 | 0.25 |
| 37 | Ta$_2$O$_5$ | 2.1136 | 0.25 |
| 38 | SiO$_2$ | 1.4525 | 0.25 |
| 39 | Ta$_2$O$_5$ | 2.1136 | 1.00 |
| 40 | SiO$_2$ | 1.4525 | 0.25 |
| 41 | Ta$_2$O$_5$ | 2.1136 | 0.25 |
| 42 | SiO$_2$ | 1.4525 | 0.25 |
| 43 | Ta$_2$O$_5$ | 2.1136 | 0.25 |
| 44 | SiO$_2$ | 1.4525 | 0.25 |
| 45 | Ta$_2$O$_5$ | 2.1136 | 0.25 |
| 46 | SiO$_2$ | 1.4525 | 0.25 |
| 47 | Ta$_2$O$_5$ | 2.1136 | 0.25 |
| 48 | SiO$_2$ | 1.4525 | 0.25 |
| 49 | Ta$_2$O$_5$ | 2.1136 | 0.25 |
| 50 | SiO$_2$ | 1.4525 | 0.25 |
| 51 | Ta$_2$O$_5$ | 2.1136 | 0.50 |
| 52 | SiO$_2$ | 1.4525 | 0.25 |
| 53 | Ta$_2$O$_5$ | 2.1136 | 0.25 |
| 54 | SiO$_2$ | 1.4525 | 0.25 |
| 55 | Ta$_2$O$_5$ | 2.1136 | 0.75 |
| 56 | SiO$_2$ | 1.4525 | 0.25 |
| 57 | Ta$_2$O$_5$ | 2.1136 | 0.25 |
| 58 | SiO$_2$ | 1.4525 | 0.25 |
| 59 | Ta$_2$O$_5$ | 2.1136 | 0.75 |
| 60 | SiO$_2$ | 1.4525 | 0.25 |
| 61 | Ta$_2$O$_5$ | 2.1136 | 0.25 |
| 62 | SiO$_2$ | 1.4525 | 0.50 |
| 63 | Ta$_2$O$_5$ | 2.1136 | 0.25 |
| 64 | SiO$_2$ | 1.4525 | 0.25 |
| 65 | Ta$_2$O$_5$ | 2.1136 | 0.25 |
| 66 | SiO$_2$ | 1.4525 | 0.25 |
| | glass | 1.5100 | | n: refractive index
t: optical thickness

Figure 5:
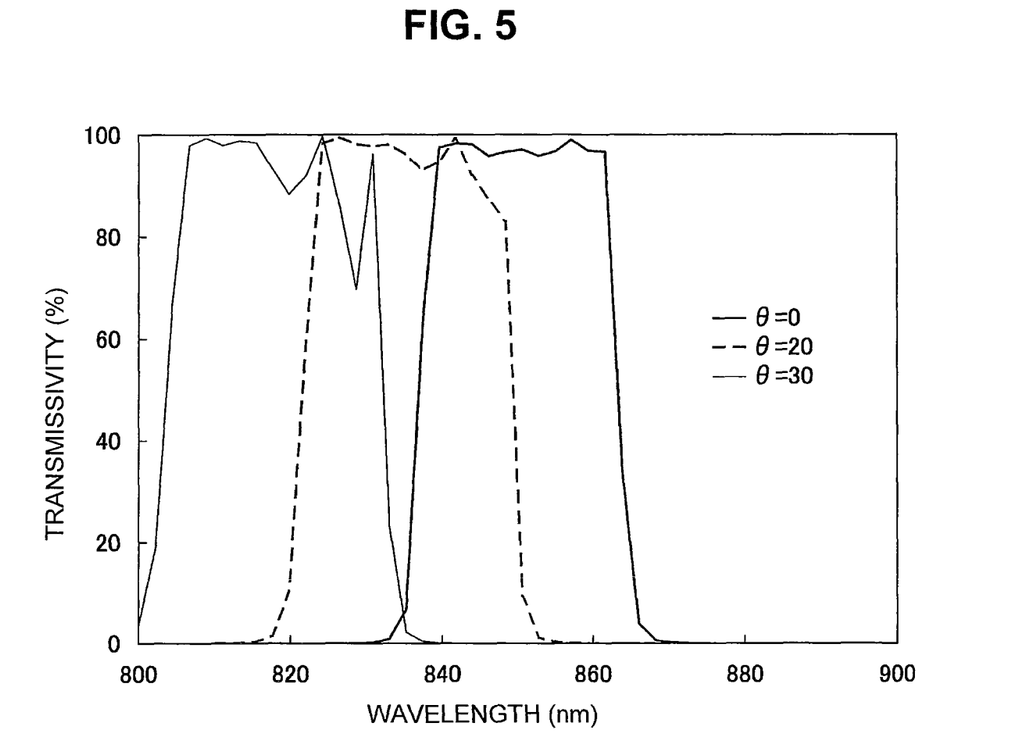
FIG. 5 is a graph showing the transmissivity as a function of the wavelength in an angle limiting filter in Example 1.

As indicated by a thick solid line (θ=0 degree) in FIG. 5, when the incident angle θ was 0 degree, the angle limiting filter 15 of low directivity transmitted, by approximately 100%, infrared light having a wavelength of 850±110 nm, and shielded light having a wavelength other than this value. Further, as indicated respectively by a dashed line (θ=20 degree) and a thin solid line (θ=30 degree) in FIG. 5, when the incident angle θ onto the angle limiting filter 15 of low directivity was increased to 10 degrees, 20 degrees, and 30 degrees, the center wavelength of the transmission wavelength range in the angle limiting filter 15 shifted from 850 nm toward the short wavelength side in association with the increase of the incident angle.

Figure 6:
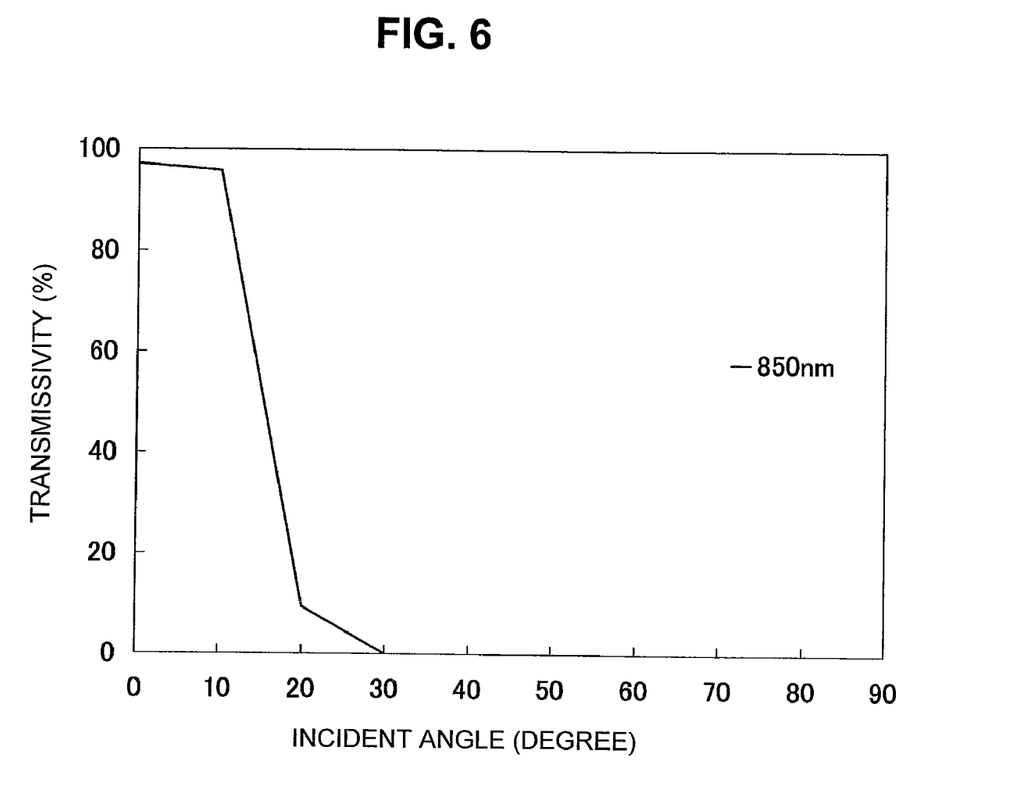
FIG. 6 is a graph showing the transmissivity as a function of the incident angle in an angle limiting filter in Example 1.

Thus, at least for infrared light at 850 nm, as shown in FIG. 6, the transmissivity was approximately 100% within an incident angle θ range from 0 to 10 degrees. Here, in a precise discussion, the light emitted from the LED 13 had a certain width about the center wavelength of approximately 850 nm. However, in the wavelength range near the wavelength of approximately 850 nm, transmissivity characteristics similar to that of the above-mentioned one was obtained. That is, during the course that the incident angle θ increased from 10 degrees to 20 degrees (30 degrees or the like in a certain wavelength), the transmissivity steeply decreased to approximately 0%.

These facts show that the angle limiting filter 15 of low directivity selectively transmits only infrared light having a wavelength of approximately 850 nm and an incident angle θ of approximately 0 to 10 degrees and shields light not satisfying these conditions.

As such, the angle limiting filter 15 of low directivity that can process light within a relatively wide wavelength range about 850 nm and that selectively transmits infrared light within a relatively wide incident angle θ range of approximately 0 to 10 degrees is suitably applicable especially to the close contact type imaging device 10 in which the above-mentioned lens array is employed together so that light from the object 11 is efficiently incident onto the image sensor 16.

Example 2

As shown in Table 2, the angle limiting filter 15 of high directivity was fabricated such that a dielectric multilayer film 27 composed of tantalum pentoxide having a refractive index of 2.1136 and silicon oxide having a refractive index of 1.4525 was provided on a glass substrate 26 having a refractive index of 1.51. The dielectric multilayer film 27 of the angle limiting filter 15 of high directivity was composed of a stack of 90 layers or the like fabricated by almost alternately stacking tantalum pentoxide films and silicon oxide films each having an optical film thickness 0.25 to 1.5 at a reference wavelength of 850 nm.

TABLE 2

| | Material | n | t |
|---|---|---|---|
| | Air | 1.0000 | |
| 1 | SiO$_2$ | 1.4525 | 0.303512 |
| 2 | Ta$_2$O$_5$ | 2.1136 | 0.094375 |
| 3 | Ta$_2$O$_5$ | 2.1136 | 0.25 |
| 4 | SiO$_2$ | 1.4525 | 0.25 |
| 5 | Ta$_2$O$_5$ | 2.1136 | 0.25 |
| 6 | SiO$_2$ | 1.4525 | 0.25 |
| 7 | Ta$_2$O$_5$ | 2.1436 | 0.25 |
| 8 | SiO$_2$ | 1.4525 | 0.25 |
| 9 | Ta$_2$O$_5$ | 2.1136 | 0.25 |
| 10 | SiO$_2$ | 1.4525 | 0.25 |
| 11 | Ta$_2$O$_5$ | 2.1136 | 0.25 |
| 12 | SiO$_2$ | 1.4525 | 0.25 |
| 13 | Ta$_2$O$_5$ | 2.1136 | 0.25 |
| 14 | SiO$_2$ | 1.4525 | 0.25 |
| 15 | Ta$_2$O$_5$ | 2.1136 | 0.25 |
| 16 | SiO$_2$ | 1.4525 | 0.25 |
| 17 | Ta$_2$O$_5$ | 2.1136 | 1.50 |
| 18 | SiO$_2$ | 1.4525 | 0.25 |
| 19 | Ta$_2$O$_5$ | 2.1136 | 0.25 |
| 20 | SiO$_2$ | 1.4525 | 0.25 |
| 21 | Ta$_2$O$_5$ | 2.1136 | 0.25 |
| 22 | SiO$_2$ | 1.4525 | 0.25 |
| 23 | Ta$_2$O$_5$ | 2.1136 | 0.25 |
| 24 | SiO$_2$ | 1.4525 | 0.25 |
| 25 | Ta$_2$O$_5$ | 2.1136 | 0.25 |
| 26 | SiO$_2$ | 1.4525 | 0.25 |
| 27 | Ta$_2$O$_5$ | 2.1136 | 0.25 |

TABLE 2-continued

| | Material | n | t |
|---|---|---|---|
| 28 | SiO$_2$ | 1.4525 | 0.25 |
| 29 | Ta$_2$O$_5$ | 2.1136 | 0.25 |
| 30 | SiO$_2$ | 1.4525 | 0.25 |
| 31 | Ta$_2$O$_5$ | 2.1136 | 0.25 |
| 32 | SiO$_2$ | 1.4525 | 0.25 |
| 33 | Ta$_2$O$_5$ | 2.1136 | 0.25 |
| 34 | SiO$_2$ | 1.4525 | 0.25 |
| 35 | Ta$_2$O$_5$ | 2.1136 | 0.25 |
| 36 | SiO$_2$ | 1.4525 | 0.25 |
| 37 | Ta$_2$O$_5$ | 2.1136 | 0.25 |
| 38 | SiO$_2$ | 1.4525 | 0.25 |
| 39 | Ta$_2$O$_5$ | 2.1136 | 0.25 |
| 40 | SiO$_2$ | 1.4525 | 0.25 |
| 41 | Ta$_2$O$_5$ | 2.1136 | 0.25 |
| 42 | SiO$_2$ | 1.4525 | 0.25 |
| 43 | Ta$_2$O$_5$ | 2.1136 | 0.25 |
| 44 | SiO$_2$ | 1.4525 | 0.25 |
| 45 | Ta$_2$O$_5$ | 2.1136 | 0.25 |
| 46 | SiO$_2$ | 1.4525 | 0.25 |
| 47 | Ta$_2$O$_5$ | 2.1136 | 1.50 |
| 48 | SiO$_2$ | 1.4525 | 0.25 |
| 49 | Ta$_2$O$_5$ | 2.1136 | 0.25 |
| 50 | SiO$_2$ | 1.4525 | 0.25 |
| 51 | Ta$_2$O$_5$ | 2.1136 | 0.25 |
| 52 | SiO$_2$ | 1.4525 | 0.25 |
| 53 | Ta$_2$O$_5$ | 2.1136 | 0.25 |
| 54 | SiO$_2$ | 1.4525 | 0.25 |
| 55 | Ta$_2$O$_5$ | 2.1136 | 0.25 |
| 56 | SiO$_2$ | 1.4525 | 0.25 |
| 57 | Ta$_2$O$_5$ | 2.1136 | 0.25 |
| 58 | SiO$_2$ | 1.4525 | 0.25 |
| 59 | Ta$_2$O$_5$ | 2.1136 | 0.25 |
| 60 | SiO$_2$ | 1.4525 | 0.25 |
| 61 | Ta$_2$O$_5$ | 2.1136 | 0.25 |
| 62 | SiO$_2$ | 1.4525 | 0.25 |
| 63 | Ta$_2$O$_5$ | 2.1136 | 0.25 |
| 64 | SiO$_2$ | 1.4525 | 0.25 |
| 65 | Ta$_2$O$_5$ | 2.1136 | 0.25 |
| 66 | SiO$_2$ | 1.4525 | 0.25 |
| 67 | Ta$_2$O$_5$ | 2.1136 | 0.25 |
| 68 | SiO$_2$ | 1.4525 | 0.25 |
| 69 | Ta$_2$O$_5$ | 2.1136 | 0.25 |
| 70 | SiO$_2$ | 1.4525 | 0.25 |
| 71 | Ta$_2$O$_5$ | 2.1136 | 0.25 |
| 72 | SiO$_2$ | 1.4525 | 0.25 |
| 73 | Ta$_2$O$_5$ | 2.1136 | 0.25 |
| 74 | SiO$_2$ | 1.4525 | 0.25 |
| 75 | Ta$_2$O$_5$ | 2.1136 | 0.25 |
| 76 | SiO$_2$ | 1.4525 | 0.25 |
| 77 | Ta$_2$O$_5$ | 2.1136 | 1.50 |
| 78 | SiO$_2$ | 1.4525 | 0.25 |
| 79 | Ta$_2$O$_5$ | 2.1136 | 0.25 |
| 80 | SiO$_2$ | 1.4525 | 0.25 |
| 81 | Ta$_2$O$_5$ | 2.1136 | 0.25 |
| 82 | SiO$_2$ | 1.4525 | 0.25 |
| 83 | Ta$_2$O$_5$ | 2.1136 | 0.25 |
| 84 | SiO$_2$ | 1.4525 | 0.25 |
| 85 | Ta$_2$O$_5$ | 2.1136 | 0.25 |
| 86 | SiO$_2$ | 1.4525 | 0.25 |
| 87 | Ta$_2$O$_5$ | 2.1136 | 0.25 |
| 88 | SiO$_2$ | 1.4525 | 0.25 |
| 89 | Ta$_2$O$_5$ | 2.1136 | 0.25 |
| 90 | SiO$_2$ | 1.4525 | 0.25 |
| 91 | Ta$_2$O$_5$ | 2.1136 | 0.25 |
| | glass | 1.5100 | | n: refractive index,
t: optical thickness

Figure 7:
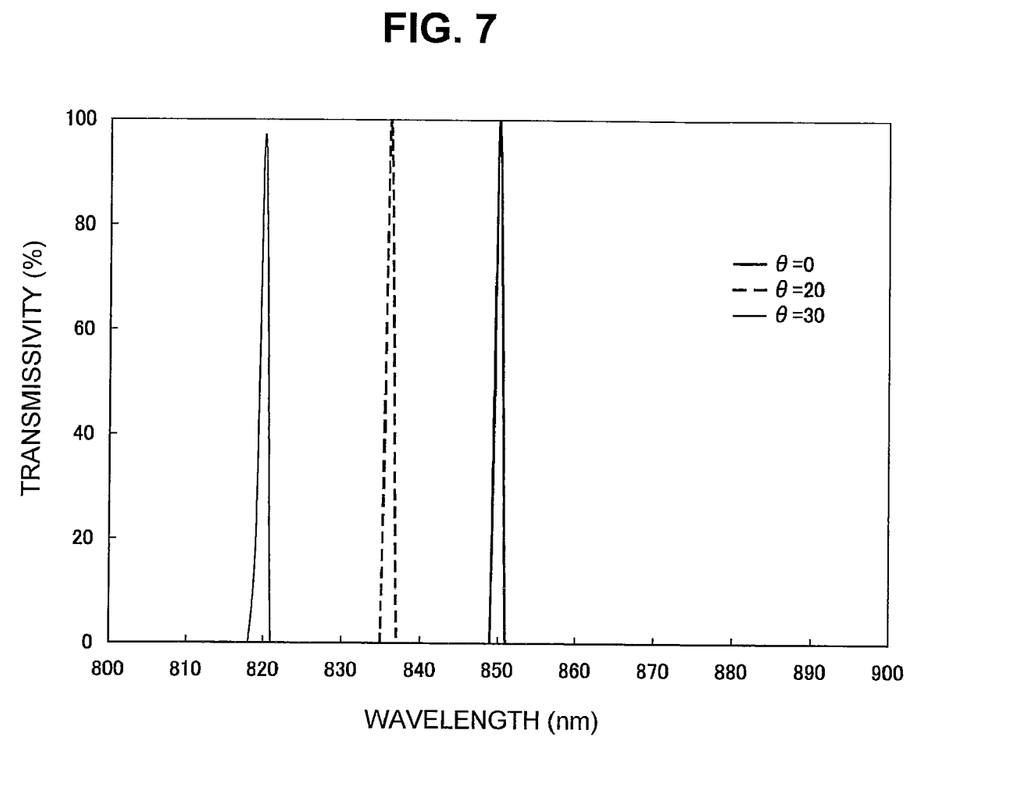
FIG. 7 is a graph showing the transmissivity as a function of the wavelength in an angle limiting filter in Example 2.

As indicated by a thick solid line (θ=0 degree) in FIG. 7, when the incident angle θ was 0 degree, the angle limiting filter 15 of high directivity transmitted only infrared light having a wavelength of approximately 850 nm, and shielded light having a wavelength other than this value. Further, as indicated respectively by a dashed line (θ=20 degree) and a thin solid line (θ=30 degree) in FIG. 7, when the incident angle θ onto the angle limiting filter 15 of high directivity was increased to 5 degrees, 10 degrees, 20 degrees, and 30 degrees, the transmission wavelength in the angle limiting filter 15 shifted from 850 nm toward the short wavelength side in association with the increase of the incident angle.

Figure 8:
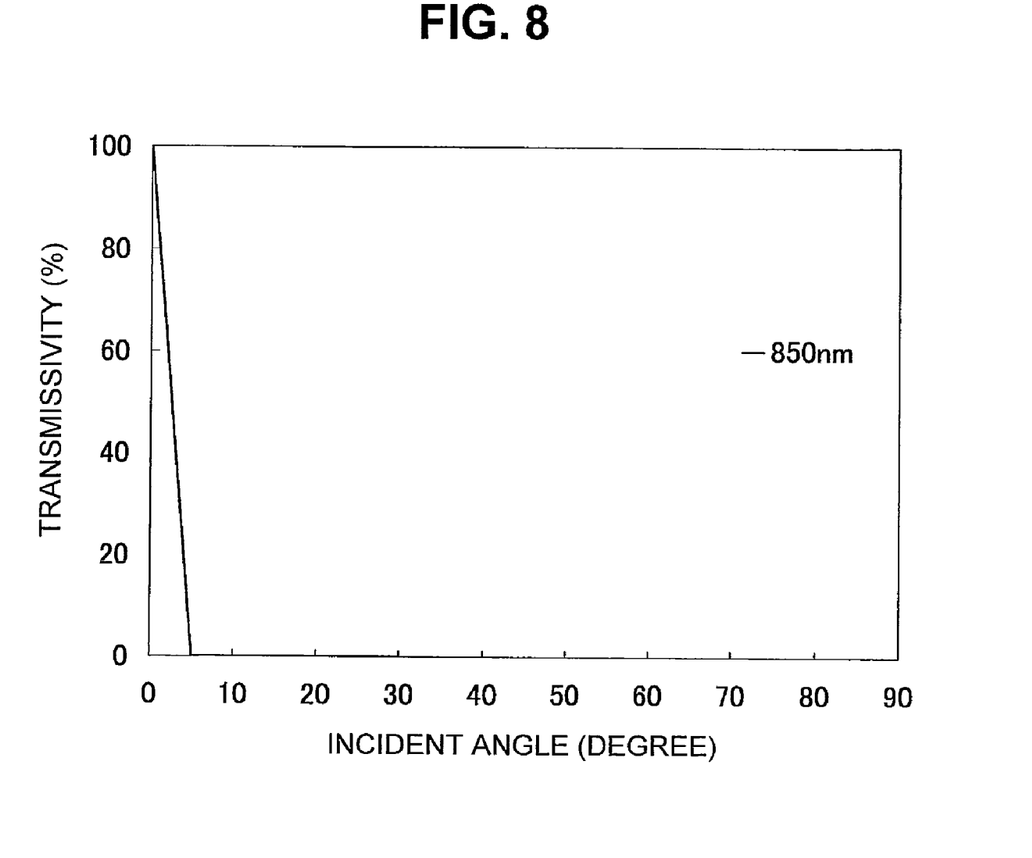
FIG. 8 is a graph showing the transmissivity as a function of the incident angle in an angle limiting filter in Example 2.

As a result, for infrared light having a wavelength of 850 nm, as shown in FIG. 8, when the incident angle θ was approximately 0 degree, the transmissivity was approximately 100%. Then, when the incident angle θ increased slightly, the transmissivity decreased steeply. That is, the transmissivity decreased to approximately 0% during the course that the incident angle θ went to approximately 5 degrees.

These facts show that the angle limiting filter 15 of high directivity selectively transmits only infrared light having a wavelength of approximately 850 nm and an incident angle θ of approximately 0 degree.

As such, the angle limiting filter 15 of high directivity that selectively transmits only infrared light having a narrow wavelength range like an approximately single wavelength and having a narrow incident angle θ range like approximately 0 degree is suitably applicable not only to the close contact type imaging device 10 that employs the above-mentioned lens array together but also especially to the close contact type imaging device 10 in which a lens array is not employed and in which light from the object 11 is incident onto the image sensor 16 only via the angle limiting filter 15.

Here, in the above-mentioned first embodiment, the image sensor 16 has sensitivity also in the visible light range. Thus, an example has been described that the dielectric multilayer film 27 served as a band pass filter for further improving the shielding property against light not used in image acquisition. However, the present invention is not limited to this case. As described above, when light is obliquely incident onto the surface of the angle limiting filter 15 provided with the dielectric multilayer film 27, the wavelength where the transmissivity steeply decreases shifts to the short wavelength side. Thus, the angle limiting filter 15 may be an arbitrary filter as long as the transmissivity for light approximately perpendicularly incident onto the surface decreases steeply at least on the long wavelength side relative to the wavelength range of 850 nm of light used in image acquisition.

Second Embodiment

Further, in the above-mentioned first embodiment, an example has been described that the close contact type imaging device 10 employed the angle limiting filter 15 constructed from the transparent glass substrate 26 and the dielectric multilayer film 27 serving as a band pass filter. However, the present invention is not limited to this configuration. That is, the close contact type imaging device 10 may employ an angle limiting filter constructed from a colored glass plate and a high-pass filter 17 composed of a dielectric multilayer film. This configuration is described below as a second embodiment. Here, when an angle limiting filter 31 according to the second embodiment is employed, the close contact type imaging device has a configuration similar to that of the above-mentioned first embodiment. Thus, its illustration and description are omitted.

Figure 9:
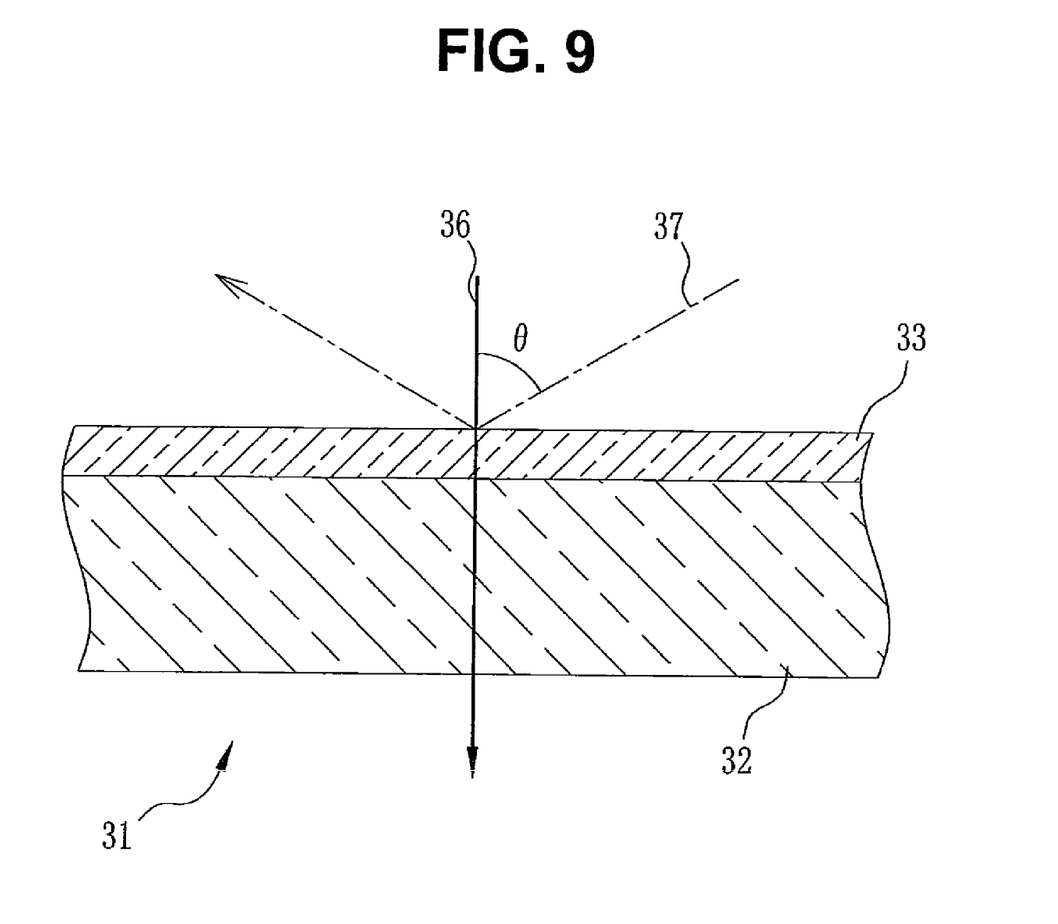
FIG. 9 is a sectional view schematically showing a configuration of an angle limiting filter according to a second embodiment.

As shown in FIG. 9, the angle limiting filter 31 is constructed from: a colored glass substrate 32 (colored substrate); and a dielectric multilayer film 33 provided on the colored glass substrate 32. The angle limiting filter 31 selectively transmits infrared light 36 that has a wavelength of 850 nm and that is approximately perpendicularly incident onto the surface. On the other hand, the angle limiting filter 31 reflects or absorbs light that has a wavelength other than 850 nm and light 37 that has a wavelength of 850 nm but that has a greatly oblique incident angle θ.

The colored glass substrate 32 is a colored glass substrate fabricated by mixing a light absorbing substance such as a transition metal oxide into a glass material. As indicated by a thick solid line in FIG. 10, the color of the colored glass substrate 32 is adjusted such that infrared light having a wavelength of 850 nm or longer is transmitted and that the transmissivity decreases steeply on the short wavelength side relative to the wavelength of 850 nm.

Further, the dielectric multilayer film 33 is fabricated by alternately stacking dielectric films having different refractive indices from each other. As indicated by a thin solid line in FIG. 10, in the case of approximately perpendicular incidence onto the surface (θ=0), the dielectric multilayer film 33 transmits infrared light having a wavelength of 850 nm or shorter, while the transmissivity decreases steeply on the long wavelength side relative to the wavelength of 850 nm. Thus, the dielectric multilayer film 33 serves as a so-called infrared cut-off filter (IRCF).

Figure 10:
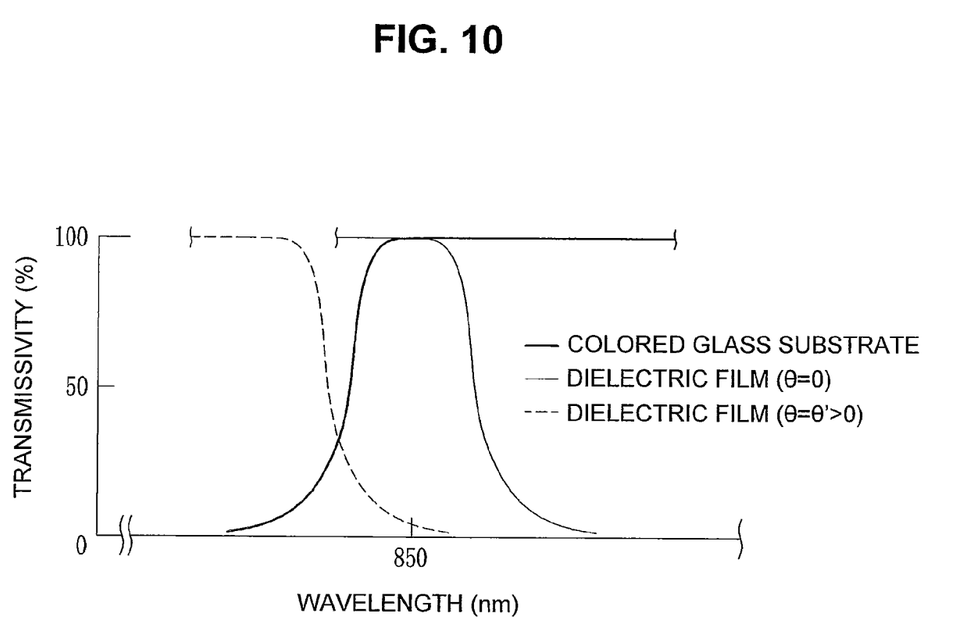
FIG. 10 is a graph schematically showing the transmissivity as a function of the wavelength in an angle limiting filter according to a second embodiment.

When light is approximately perpendicularly incident onto the surface of the angle limiting filter 31 having the above-mentioned configuration (θ=0), light within the wavelength range surrounded in the graph showing the transmissivity characteristics of the colored glass substrate 32 and the dielectric multilayer film 33 is transmitted (see FIG. 10). Thus, light transmitted through the angle limiting filter 31 is limited to infrared light that has a wavelength of 850 nm and an incident angle θ of approximately O degree. At that time, light on the short wavelength side relative to the wavelength of 850 nm is transmitted through the dielectric multilayer film 33 but is absorbed by the colored glass substrate 32. Further, light on the long wavelength side relative to the wavelength of 850 nm is reflected by the dielectric multilayer film 33.

When light is obliquely incident onto the surface of the angle limiting filter 31 (incident angle θ=θ'>0), since the colored glass substrate 32 is a uniform substrate without direction dependence, the transmissivity of the colored glass substrate 32 is approximately equal to that in the case of perpendicular incidence of light onto the surface. On the other hand, as indicated by a dashed line in FIG. 10, when light is obliquely incident onto the surface of the dielectric multilayer film 33 (θ=θ'>0), the boundary wavelength where transmission and reflection are switched to each other shifts depends on the magnitude of the incident angle θ. Specifically, the boundary wavelength shifts to the short wavelength side in comparison with the case of approximately perpendicular incidence onto the surface (θ=0). Thus, even infrared light having a wavelength of 850 nm can be reflected by the dielectric multilayer film 33 when obliquely incident onto the surface of the angle limiting filter 31.

As such, when the angle limiting filter 31 is constructed from the colored glass substrate 32 and the dielectric multilayer film 33 serving as an infrared cut-off filter, characteristics similar to those in the angle limiting filter 15 according to the above-mentioned first embodiment are obtained. Further, the angle limiting filter 31 includes the colored glass substrate 32 for absorbing the short wavelength range. Thus, even in a case that light having a wavelength other than the wavelength (850 nm) used in image acquisition can be incident, appropriate directivity and wavelength selectivity are obtained without the necessity of employing together the high-pass filter 17 employed in the above-mentioned first embodiment.

Further, the dielectric multilayer film 27 constituting the angle limiting filter 15 according to the above-mentioned first embodiment serves as a band pass filter, and hence has two boundary wavelengths where transmission and reflection are switched to each other. In contrast, the dielectric multilayer film 33 constituting the angle limiting filter 31 has only one boundary wavelength where transmission and reflection are switched to each other. Thus, the materials and the layer structure of the dielectric multilayer film 33 can more easily be selected and adjusted.

Further, the angle limiting filter 31 has a simple structure that the dielectric multilayer film 33 is provided on the colored glass substrate 32. Thus, the angle limiting filter 31 can be fabricated easily at a low cost. Further, precise alignment to the image sensor 16 is unnecessary. Thus, the close contact type imaging device 10 employing the angle limiting filter 31 can be fabricated easily at a low cost and still can acquire a high definition image.

Here, in the colored glass substrate 32, when the light absorbing substance to be mixed is changed, the boundary wavelength where absorption and transmission are switched to each other can be adjusted. Further, in the dielectric multilayer film 33, when the materials and the layer structure are changed, the boundary wavelength where reflection and transmission are switched to each other can be adjusted. Thus, when the boundary wavelengths where transmission and absorption (reflection) are switched to each other in the colored glass substrate 32 and the dielectric multilayer film 33 are adjusted, the wavelength range of light transmission through the angle limiting filter 31 and the incident angle range of light transmission (directivity) can be adjusted arbitrarily.

Here, in the above-mentioned second embodiment, an example has been described that the substrate of the angle limiting filter was the colored glass substrate 32. However, the present invention is not limited to this configuration. For example, the substrate of the angle limiting filter 31 may be a transparent glass substrate. Then, the dielectric multilayer film 33 may be provided on this transparent glass substrate. Then, in correspondence to the modification that the substrate of the angle limiting filter 31 is a transparent glass substrate, the protection cover 12 may be a colored glass plate having a color similar to that of the above-mentioned colored glass substrate 32.

Further, in the above-mentioned second embodiment, an example has been described that the dielectric multilayer film 33 served as a low-pass filter. However, the dielectric multilayer film 33 may be an arbitrary filter as long as the transmissivity for light approximately perpendicularly incident onto the surface decreases steeply at least on the long wavelength side relative to the wavelength range of 850 nm of light used in image acquisition. Thus, similarly to the above-mentioned first embodiment, the dielectric multilayer film provided on the colored glass substrate 32 may serve as a band pass filter. However, for the purpose of further simplification of the material selection and the layer structure of the dielectric multilayer film 33, it is preferable that the dielectric multilayer film 33 serves as a low-pass filter as described in the above-mentioned second embodiment.

Here, in the first and the second embodiments described above, an example has been described that the close contact type imaging device 10 acquires an image by using infrared light having a wavelength of 850 nm. However, the present invention is not limited to this configuration. That is, the materials and the layer structure of the dielectric multilayer film 27 or 33 and the color of the colored glass substrate 32 may be adjusted so that the image acquisition may be performed by using light having another wavelength such as 650 nm.

Further, in the close contact type imaging device 10 according to the first and the second embodiments described above, image acquisition was performed by projecting infrared light having a wavelength of 850 nm onto the object 11 from the under (from the image sensor 16 side). However, the present invention is not limited to this configuration. That is, the object 11 may be illuminated from the above (from the side opposite to the image sensor 16). Further, without providing a dedicated illumination member (the LED 13), natural light may be used in the image acquisition.

Here, in the first and the second embodiments described above, an example has been described that the dielectric film 27 serving as a band pass filter or the dielectric film 33 serving as a low-pass filter is provided on one surface of the glass substrate 26 or the colored glass substrate 32. Nevertheless, in a case that the glass substrate 26 or the colored glass substrate 32 is thin, when the dielectric film 27 or 33 is provided only on one surface, curvature can arise in the angle limiting filter 15 or 31. Thus, a part of the dielectric multilayer film 27 or 33 may be provided on one surface of the glass substrate 26 or 32, while the remaining layers of the dielectric multilayer film 27 or 33 may be provided on the other surface.

Figure 11A:
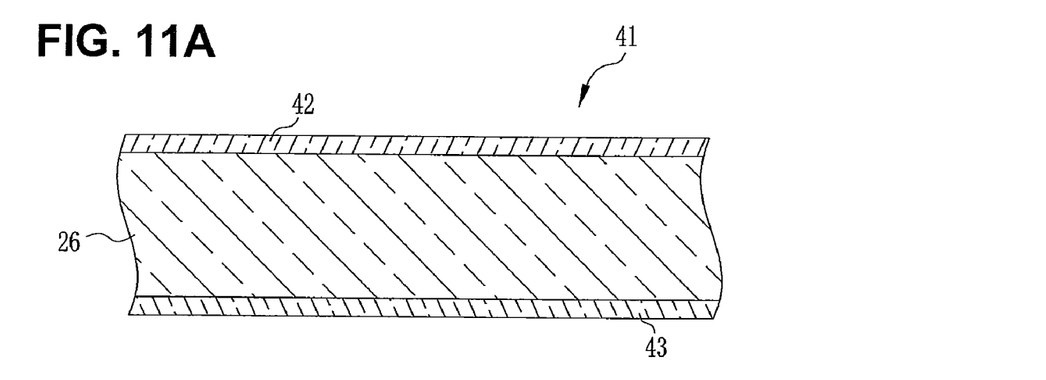
FIGS. 11A-11C are: a sectional view showing a configuration of an angle limiting filter according to a modification; and graphs schematically showing the transmissivity as a function of the wavelength.
Figure 11B:
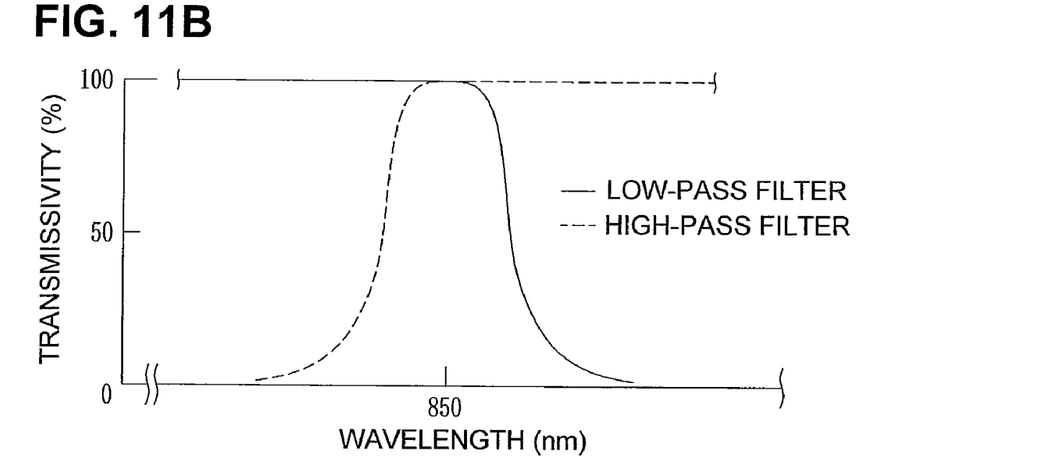

For example, like in the above-mentioned first embodiment, when an angle limiting filter is to be constructed from the transparent glass substrate 26 and the dielectric multilayer film 27 serving as a band pass filter, like in an angle limiting filter 41 shown in FIG. 11A, a low-pass filter 42 composed of a dielectric multilayer film is provided on one surface of the glass substrate 26, while a high-pass filter 43 composed of a dielectric multilayer film is provided on the other surface. As schematically indicated by a solid line in FIG. 11B, the low-pass filter 42 provided here has a stack structure designed such that light that is perpendicularly incident onto the surface and that has a wavelength of 850 nm or shorter is transmitted and that the transmissivity decreases steeply on the long wavelength side relative to the wavelength of 850 nm. Similarly, as indicated by a dashed line in FIG. 11B, the high-pass filter 43 has a stack structure designed such that light that is perpendicularly incident onto the surface and that has a wavelength of 850 nm or longer is transmitted and that the transmissivity decreases steeply on the short wavelength side relative to the wavelength of 850 nm.

Figure 11C:
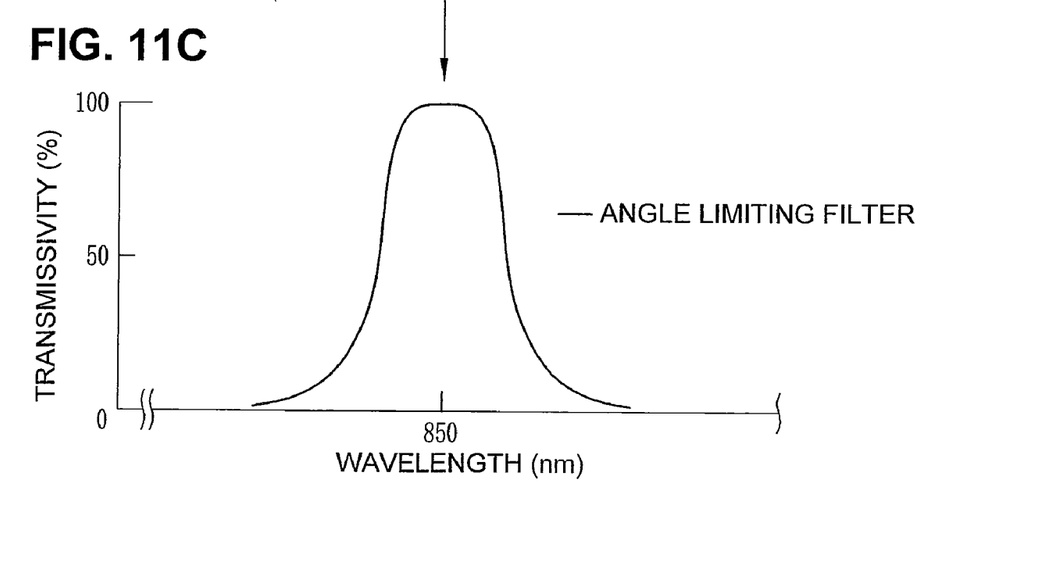

As such, when the low-pass filter 42 and the high-pass filter 43 are provided respectively on the two surfaces of the glass substrate 26, the optical characteristics of the entirety of the angle limiting filter 41 constructed from the low-pass filter 42 and the high-pass filter 43 are as shown in FIG. 11C. That is, the entire filter serves as a band pass filter that transmits only infrared light having a wavelength of 850 nm. Thus, without the occurrence of curvature even in a case that the glass substrate 26 is thin, the angle limiting filter 41 serves as a filter having optical characteristics similar to those of the angle limiting filter 15 described in the first embodiment. In this example, the low-pass filter 42 and the high-pass filter 43 have been provided respectively in the two surfaces of the glass substrate 26 such that the entirety of the filter serves as a band pass filter. However, the dielectric multilayer films provided respectively on the two surfaces of the glass substrate 26 need not independently serve as an optically significant dielectric multilayer film like the low-pass filter 42 and the high-pass filter 43. That is, the layer structures and the like of the dielectric multilayer films on the two surfaces may be designed such that the entirety of the dielectric multilayer films on the two surfaces of the glass substrate 26 serves as a band pass filter and that curvature does not occur in the angle limiting filter 41.

Further, like in the above-mentioned second embodiment, when an angle limiting filter is to be constructed from the colored glass substrate 32 and the dielectric multilayer film 33 serving as a low-pass filter, similarly to the above-mentioned case, a dielectric multilayer film is provided on each of the two surfaces of the colored glass substrate 32. At that time, the dielectric multilayer films provided on the colored glass substrate 32 do not independently have a particular optical function (of a low-pass filter, a high-pass filter, or a band pass filter). However, the individual layer structures and the like are designed such that the entirety of the dielectric multilayer films serves as a low-pass filter similar to the dielectric multilayer film 33. As such, when a dielectric multilayer film is provided on each of the two surfaces of the colored glass substrate 32 such that the entirety serves as a low-pass filter similar to the dielectric multilayer film 33, similarly to the above-mentioned case, curvature in the angle limiting filter is avoided.

Here, in the first and the second embodiments described above, the dielectric multilayer film 27 or 33 has been provided on one surface of the glass substrate 26 (or the colored glass substrate 32). However, the present invention is not limited to this configuration. That is, the same dielectric multilayer films 27 or 33 may be provided respectively on the two surfaces of the glass substrate 26 or 32. As such, when the dielectric multilayer films 27 or 33 are provided respectively on the two surfaces of the glass substrate 26 or 32, curvature in the angle limiting filter is avoided. Further, the directivity and the wavelength selectivity for light to be transmitted are improved.

Further, in the first and the second embodiments described above, an example has been described that the dielectric multilayer film 27 or 33 was provided on the object 11 side of the glass substrate 26 or 32. However, when the dielectric multilayer film 27 or 33 is to be provided on one side of the glass substrate 26 or 32, the dielectric multilayer film 27 or 33 may be provided on the surface of the image sensor 16 side of the glass substrate 26 or 32. Nevertheless, when the dielectric multilayer film 27 or 33 is provided only on the surface of the image sensor 16 side of the glass substrate 26 or 32, light reflected in the boundary or the like between the dielectric multilayer film 27 or 33 and the glass substrate 26 or 32 can cause stray light. Thus, when the dielectric multilayer film 27 or 33 is to be provided only on one surface of the glass substrate 26 or 32, it is preferable that the dielectric multilayer film 27 or 33 is provided on the object 11 side like in the above-mentioned embodiment.

Here, in the first and the second embodiments described above, an example has been described that the angle limiting filter 15 or 31 is provided separately from the protection cover 12. However, the present invention is not limited to this configuration. That is, the angle limiting filter 15 or 31 may serve as the protection cover 12. In this case, for the purpose of protection from scratches and the like, it is preferable that the dielectric multilayer film 27 or 33 is provided on the surface of the image sensor 76 side rather than on the upper surface that contacts directly with the object 11.

Here, in the first and the second embodiments described above, the glass substrate 26 or the colored glass substrate 32 has been employed as the substrate of the angle limiting filter 15 or 31. However, the substrate of the angle limiting filter 15 or 31 is not limited to a glass material and may be a resin material.

Here, in the first and the second embodiments described above, an example has been described that the angle limiting filter 15 was constructed from the transparent glass substrate 26 and the dielectric multilayer film 27 serving as a band pass filter or alternatively that the angle limiting filter 31 was constructed from the colored glass substrate 32 and the dielectric multilayer film 33 serving as a low-pass filter. However, the present invention is not limited to these configurations. That is, an angle limiting filter may be constructed from an arbitrary combination of a glass substrate 26, a colored glass substrate 32, a dielectric multilayer film serving as a low-pass filter, a dielectric multilayer film serving as a high-pass filter, and a dielectric multilayer film serving as a band pass filter. For example, an angle limiting filter may be constructed such that a dielectric multilayer film serving as a band pass filter is provided on the colored glass substrate 32. Further, for example, like in the first embodiment, when the dielectric multilayer film 27 serving as a band pass filter is to be provided on the transparent glass substrate 26, the dielectric multilayer film 27 may be fabricated by stacking a dielectric multilayer film serving as a low-pass filter and a dielectric multilayer film serving as a high-pass filter so as to serve as a band pass filter. Further, when the angle limiting filter 15 according to the first embodiment is employed, the protection cover 12 may be constructed from a colored glass plate.

Here, in this specification, the term "approximately perpendicular" not merely indicates angles approximately perpendicular to the surface, but also depends on the interval of the object 11 and the image sensor 16 and the arrangement pitch of the imaging areas of the image sensor. That is, the term indicates an angle range where light from the object 11 is incident onto the image sensor 16 in such a manner that each imaging area corresponds to each part of the object 11 in one-to-one correspondence. Thus, even when the angle is not near 90 degrees relative to the surface in contrast to the cases of the first and the second embodiments described above, the situation is included within the scope of being approximately perpendicular as long as the above-mentioned correspondence relation is satisfied.

What is claimed is:

1. An imaging device for acquiring an image of an object almost in close contact to an image sensor by utilizing light within a wavelength range,
   the imaging device comprising an angle limiting filter that includes:
   a substrate of a parallel plate which is a colored substrate that transmits light having a longer wavelength than the wavelength range and absorbs light having a shorter wavelength than the wavelength range; and
   a dielectric multilayer film (i) which is provided on the substrate, and (ii) which transmits the light approximately perpendicularly incident onto a surface thereof and shields the light obliquely incident onto the surface.

2. The imaging device according to claim 1, wherein the dielectric multilayer film serves as a band pass filter for shielding light outside the wavelength range and approximately perpendicularly incident onto the surface.

3. The imaging device according to claim 1, wherein the dielectric multilayer film serves as a low-pass filter for transmitting light that is perpendicularly incident onto the surface and that has a shorter wavelength than the wavelength range and for shielding light that is perpendicularly incident onto the surface and that has a longer wavelength than the wavelength range.

4. The imaging device according to claim 1, wherein the dielectric multilayer film is provided on each surface of the substrate.

* * * * *